April 4, 1967  C. D. LENNON ETAL  3,312,425
AIRCRAFT

Filed Oct. 12, 1965  5 Sheets-Sheet 1

INVENTORS
CLARENCE D. LENNON
ROBERT G. VARNER

BY *Garvey & Garvey*
ATTORNEYS

April 4, 1967
C. D. LENNON ETAL
3,312,425
AIRCRAFT
Filed Oct. 12, 1965
5 Sheets-Sheet 2
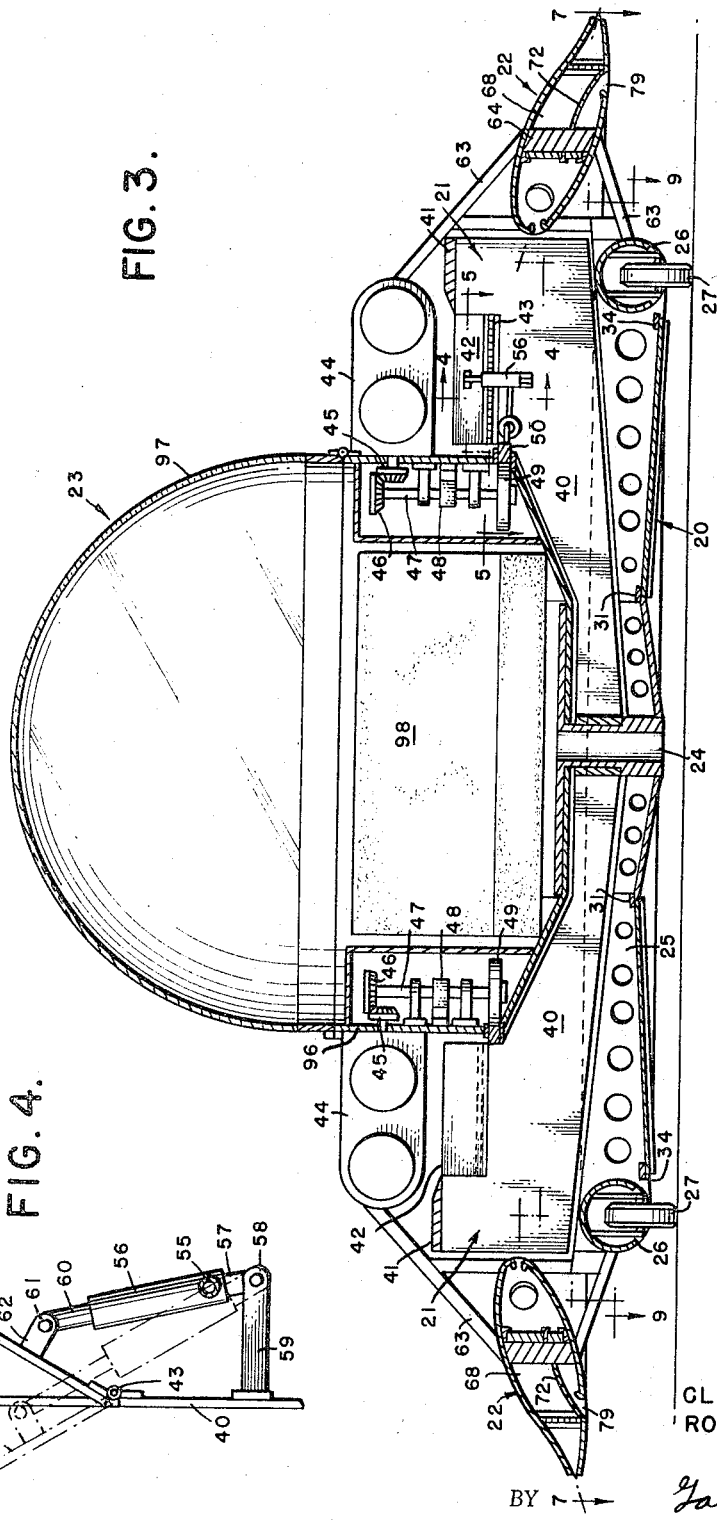
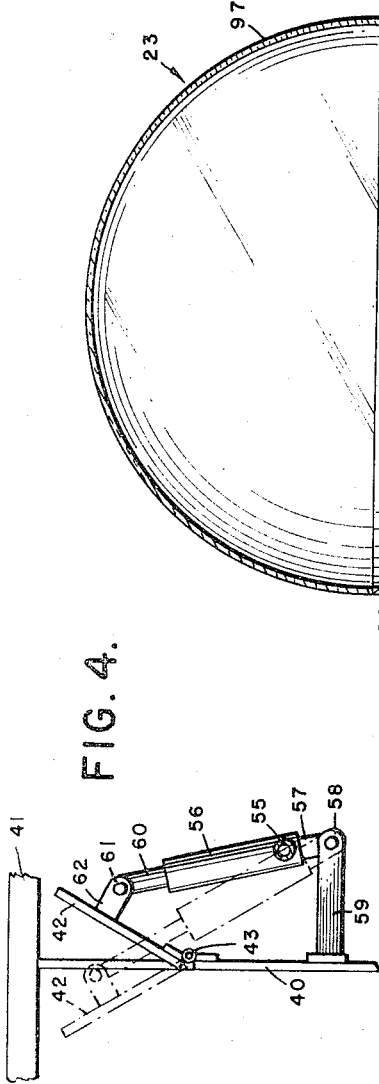
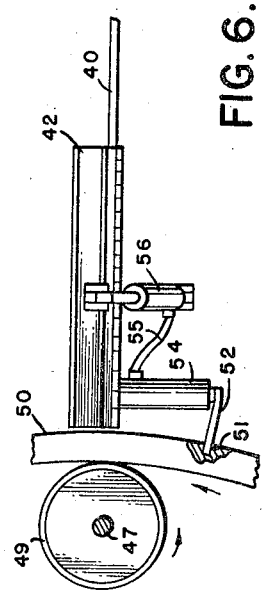
INVENTORS
CLARENCE D. LENNON
ROBERT G. VARNER
BY *Garvey & Garvey*
ATTORNEYS

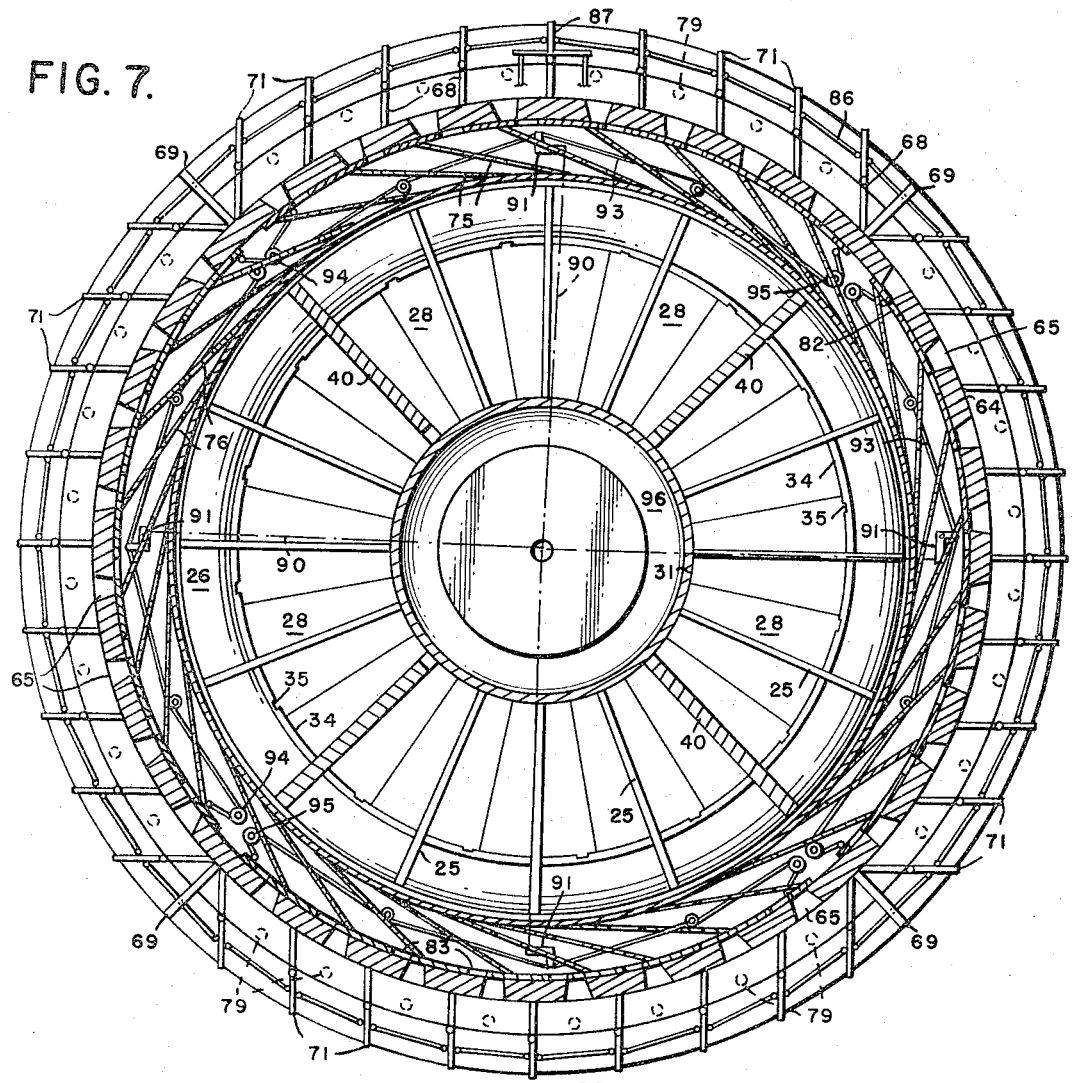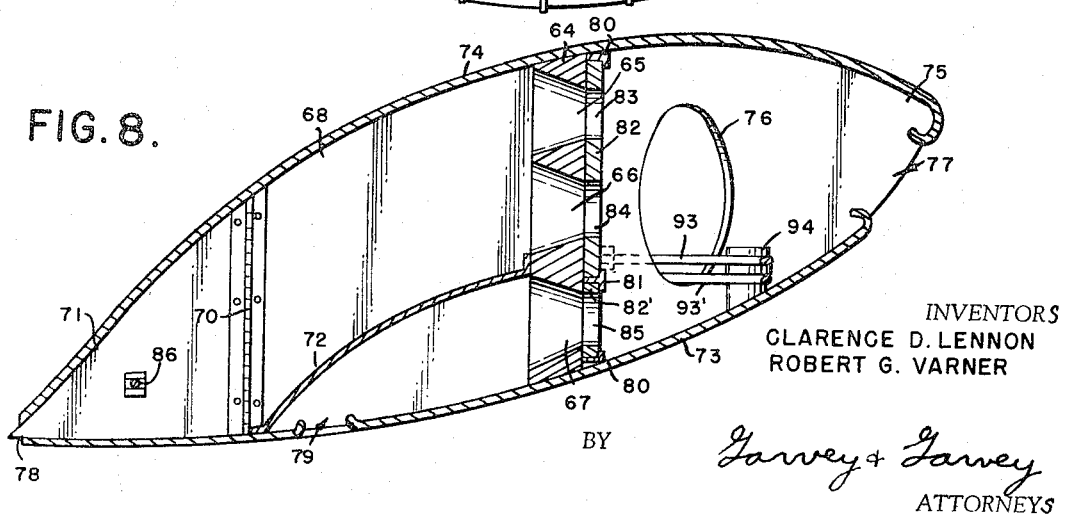

April 4, 1967     C. D. LENNON ET AL     3,312,425
AIRCRAFT
Filed Oct. 12, 1965     5 Sheets-Sheet 4
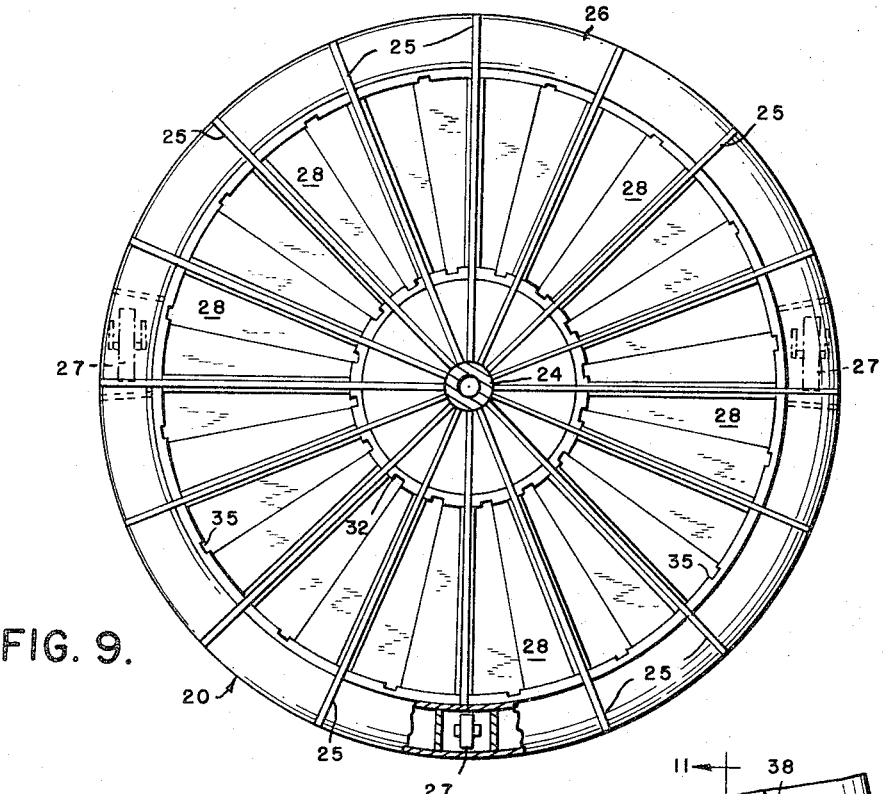
FIG. 9.
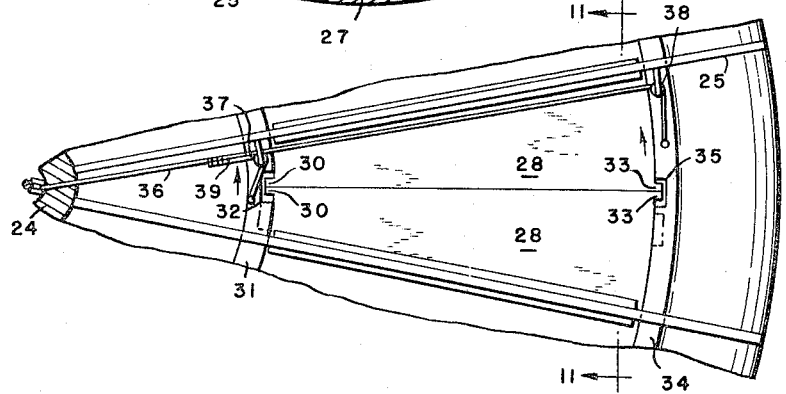
FIG. 11.     FIG. 10.
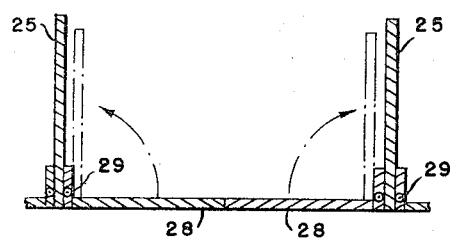
INVENTORS
CLARENCE D. LENNON
ROBERT G. VARNER
BY *Garvey & Garvey*
ATTORNEYS April 4, 1967 C. D. LENNON ETAL 3,312,425
AIRCRAFT
Filed Oct. 12, 1965 5 Sheets-Sheet 5

INVENTORS
CLARENCE D. LENNON
ROBERT G. VARNER

BY *Garvey & Garvey*

ATTORNEYS

United States Patent Office 3,312,425
Patented Apr. 4, 1967

3,312,425
AIRCRAFT
Clarence D. Lennon, 1014 12th Ave., St. Petersburg, Fla. 33705, and Robert G. Varner, Box 823, Rte. 1, Palm Harbor, Fla. 33563
Filed Oct. 12, 1965, Ser. No. 495,172
10 Claims. (Cl. 244—12)

This invention relates to aircraft, and more particularly, to aircraft adapted for vertical take-off and landing, an object of which is to effect superior lift characteristics and high lateral speed capability.

Another object is to provide a disc-shaped aircraft including a cabin, a circular, horizontally-disposed, centrifugal impeller assembly around the cabin, and an airfoil embodying a lift and control device mounted circumferentially about, and immediately adjacent to, the impeller assembly, for directing air over and through the airfoil.

Other objects are to provide an airfoil of predetermined shape set at an angle to the horizontal, for effecting optimum lift; to provide an airfoil including a lift and control device having spaced, stationary and movable vanes forming a plurality of air chambers for effecting control, the movable vanes being adjusted to produce directional heading of the aircraft; and to provide an airfoil of the character described having a plurality of orifices selectively opened and closed to produce vertical and lateral thrust components with resultant vertical and lateral movement of the aircraft.

A further object is to provide an aircraft including an impeller assembly and airfoil of the character described, wherein the upper face of the impeller assembly is open and the lower face thereof is normally closed, closure being effected by a system of shutters which are adapted to be opened in the event of failure of the aircraft engines, producing auto-rotation of the impeller, to permit a safe emergency landing.

Other objects of the invention will be manifest from the following description of the present preferred form of the invention, taken in connection with the accompanying drawings, wherein:

FIG. 3 is a transverse sectional view of the aircraft of the present invention, showing to advantage details of construction;

FIG. 4 is an enlarged sectional view taken along the lines 4—4 of FIG. 3, looking in the direction of the arrows, and showing the movable blade of the impeller assembly forming a part of the present invention;

FIG. 5 is an enlarged sectional view taken on the lines 5—5 of FIG. 3, looking in the direction of the arrows, showing the movable blade of the impeller assembly in inoperative position;

FIG. 6 is a view similar to FIG. 5, showing the movable blade in operative position;

FIG. 7 is a sectional view taken along the lines 7—7 of FIG. 3, looking in the direction of the arrows and showing to advantage the airfoil lift and control assembly forming a part of the present invention;

FIG. 8 is an enlarged horizontal sectional view taken through the airfoil forming a part of the present invention;

FIG. 9 is a sectional view taken on the line 9—9 of FIG. 3, looking in the direction of the arrows, showing to advantage the base of the present aircraft;

FIG. 10 is an enlarged fragmentary plan view of a portion of the base showing to advantage the emergency shutter system forming a part of the present invention;

FIG. 11 is a sectional view taken along the lines 11—11 of FIG. 10, looking in the direction of the arrows, showing in dotted lines, the alternate position of the shutters;

Figure 1:
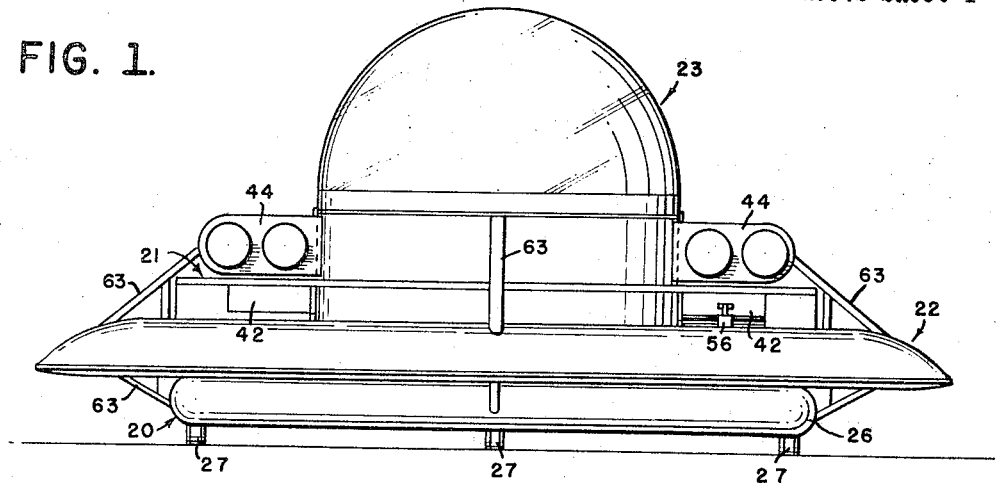
FIG. 1 is a front elevational view of an aircraft constructed in accordance with the present invention.

Referring now in greater detail to the drawings, the aircraft of the present invention comprises a base 20 of disc shape on which is centrally mounted a circular, centrifugal impeller assembly 21. An airfoil lift and control assembly 22 is mounted circumferentially about, and immediately adjacent impeller assembly 21 for coaction therewith. A cabin 23 is centrally mounted above base 20 and impeller assembly 21.

As shown to advantage in FIGS. 3 and 9, base 20 includes a central hub 24 from which a plurality of equi-spaced girders 25 of equal length extend radially. An annular flotation ring 26 is fixed in any suitable manner to the outer limits of girders 25 for buoying the aircraft in water. Base 20 further includes wheel assemblies 27 fixed to, and pending from, flotation ring 26 at 90° intervals for supporting the aircraft on land surfaces.

Base 20 is further provided with a plurality of shutters 28 hingedly connected at 29 to girders 25 intermediate flotation ring 26 and hub 24. As shown in FIG. 11, shutters 28 are preferably hinged to both faces of each girder 25, each shutter extending to a point midway adjacent girders 25, so that a pair of shutters lies between the girders. Each shutter 28 is provided with an extension tab or abutment 30, the tabs of adjacent shutters 28 being so located that they are contiguous when in the lowered position, as shown in FIG. 10. An inboard slidable ring 31 is supported by girders 25 superjacent extensions 30 of shutters 28, said ring being provided with a series of recesses or notches 32 normally non-aligned with shutter extension tabs 30 but adapted to be moved into superjacent relationship with the tabs when it is desired to open shutters 28 to the position shown in dotted lines in FIG. 11. Each shutter 28 is additionally provided with an outer extension tab or abutment 33, which tabs, as shown in FIG. 10, are also adapted to be in contiguous relationship when the shutters are in lowered or closed position. An outboard ring 34 is also slidably supported by girders 25, which ring is also provided with recesses or notches 35 adapted to register with extensions 33 synchronously with the alignment of inboard ring recesses 32 with extensions 30 to permit opening of the shutters.

In accordance with the objects of the present invention, shutters 28 are opened only in case of emergency to effect safe landing of the aircraft, and the opening is effected manually by means of a shutter cable 36 trained over pulleys 37 and 38 to outboard ring 34. A supplemental shutter cable 39 affixed to cable 36 is trained over pulley 37 into engagement with movable inboard ring 31. Cable 36 extends upwardly into cabin 23 for ready access to the pilot. Shutters 28 are normally left in the closed position shown in FIGS. 3 and 9 and are only raised to the open position under emergency conditions to be hereinafter more fully discussed.

Impeller assembly 21 is of the centrifugal type and includes a plurality of vertically-disposed blades 40 extending radially from hub 24 in spaced relationship, a portion of each blade being reduced for interpositioning between base 20 and cabin 23. The height of each blade 40 is increased laterally of cabin 23 and to the outermost portion thereof is affixed a ring 41 in engagement with the upper edge of each blade and extending completely around the aircraft, for shaping and directing the centrifugal flow of air produced by the rotating blades. Adjacent ring 41, a portion of blade 40 is hingedly connected at 43 to the main portion thereof to provide a moving surface and thereby change the chamber of said blade relative to its vertical component. Blades 40 are rotated by a suitable source of power such as engines 44. These engines may be mounted laterally adjacent cabin 23. The source of power may be of the reciprocal type, as illustrated, rotary, jet, turbine or electric. For supplying rotary motion to the impeller blades, each engine is provided with a geared power take-off 45 connected to a mating gear 46 of a driven shaft 47. A conventional centrifugal clutch 48 is positioned intermediate the length of shaft 47. A friction-type roller 49, disposed in a horizontal plane, is fixed to the lower terminal of the shaft. Each roller 49 is in diametrically opposed engagement with the inner periphery of a rotatably mounted impeller drive ring 50 disposed between cabin 23 and impeller blades 40.

As shown to advantage in FIGS. 5 and 6, ring 50 is provided with diametrically opposed recesses 51 in the outer periphery thereof, each of which is adapted for the reception of a pin 52 of a hydraulic actuator mounted on a blade 40 and including a piston 53 movable in a cylinder 54, the piston being normally urged to its extended position by a compression spring. The actuator is connected by a hose 55 to a movable vane actuating cylinder 56 which is shown to advantage in FIG. 4. Cylinder 56 is provided with a lower arm 57 which is pivotally connected at 58 to a rigid horizontally disposed support member 59, the free end of which is in fixed engagement with blade 40 at a point subjacent an intermediate section of movable portion 42 of blade 40. Cylinder 56 is further provided with a piston 60 the outer terminal of which is pivotally connected at 61 to an arm 62, the free end of the arm being fixed to a face of movable portion 42 of blade 40. Pivotal connection 58 and 61 permit movement of cylinder 56 from the inoperative position shown in full lines in FIG. 4 to the operative position shown in dotted lines in the same view, at which time, piston 60 is in fully extended position.

In accordance with the objects of the present invention, when engines 44 are actuated, clutch 48 is engaged to rotate friction-type rollers 49, ring 50 being rotated in the direction indicated by the arrows in FIGS. 5 and 6. By virtue of the connection of pin 52 in recess 51 of ring 50, the latter opposes the hydraulic pressure of the hydraulic actuator. This effects movement of piston 53 into cylinder 54 and creates limited relative movement of ring 50 with respect to blades 40. The entry of piston 53 into cylinder 54 in turn, results in application of hydraulic pressure 55 to cylinder 56, causing movement of piston 60 to its extended position and movement of movable part 42 of blade 40 from the inoperative position to the operative position as shown in FIG. 4. When piston 53 has been urged wholly within cylinder 54, ring 50 and blades 40 are rotated together to produce rotation of the impeller blades.

Airfoil lift and control assembly 22 is mounted circumferentially about, and immediately adjacent to, impeller assembly 21, assembly 22 being supported by a plurality of struts 63. Assembly 22 is so constructed that a cross section thereof taken from a point adjacent to, and tangentially from, the periphery of the circular path described by blades 40 of impeller assembly 21 is of the most desirable airfoil shape. Additionally, as will be noted from FIG. 3, assembly 22 is disposed at an angle to the horizontal which provides the most desirable lift coefficient for the airfoil shape. This assembly therefore is of optimum shape and angle of attack.

Assembly 22 basically includes a circular spar 64 which, as shown to advantage in FIG. 8, is provided with vertically aligned orifices 65, 66 and 67. Extending outwardly from spar 64 are spaced stationary vanes 68, the upper and lower contours of which are curved to produce the desired airfoil shape. It will be noted from FIG. 7 that stationary vanes 68 are so arranged that the vanes of each quadrant of the circular aircraft are parallelly arranged with respect to each other, which quadrants are separated by walls 69, the latter being radially disposed with respect to the aircraft and extending from spar 64 to the outer periphery of the aircraft. The outboard edge of each stationary vane 68 is hingedly connected at 70 to a movable vane 71 which is of generally triangular shape to effect the desired airfoil shape, the movable vane extending to the outer periphery of the aircraft. A curved baffle 72 extends from spar 64 at a point above orifice 67 rearwardly and downwardly into engagement with the lower skin surface 73 of the airfoil assembly, and upper skin surface is indicated at 74.

Assembly 22 further includes a plurality of spaced ribs 75 inboard of spar 64 which are tangentially arranged with respect to the circular path of movement of blades 40 and between which ribs, a portion of the air is directed by the impeller assembly. The upper and lower surfaces of ribs 75 are contoured for optimum airfoil shape and are adapted to support skin surfaces 73 and 74. Each tangential rib 75 is provided with a compression port 76 through which air may pass to effect more uniform air pressure in the air chambers formed by the ribs and skin surfaces.

It will be noted from FIG. 8 that assembly 22 is provided with an intake slot 77 which is located along the inner periphery of the assembly adjacent impeller assembly 21 for admitting air interiorly of the airfoil assembly as well as over the surfaces thereof. The outboard edge of the airfoil lift and control assembly also includes horizontal thrust orifice 78, at its outer periphery, where surfaces 73 and 74 are proximate each other, which orifice establishes a path for the explosion of air passing through orifices 65 and 66. Assembly 22 further includes a vertical thrust orifice 79 in skin surface 73 beneath baffle 72 and adjacent its connection to skin surface 73 thereby establishing a path for the expulsion of air flowing through orifice 67.

Inboard of circular spar 64 there are provided spaced upper and lower tracks 80 adjacent the upper and lower limits of the spar and intermediate track 81 located between orifices 66 and 67. A plurality of spaced valve members 82 are slidably mounted between upper track 80 and intermediate track 81 and similar valve members 82' are slidably mounted between intermediate track 81 and lower track 80, as shown to advantage in FIGS. 8 and 13. Each valve member 82 preferably extends through approximately a quadrant of the circular spar and is provided with pairs of spaced, vertically aligned openings 83 and 84 adapted to be moved into and out of alignment with openings 83 and 84. Under these conditions, air flowing through intake slot 77 is compressed and forced through orifices 65 and 66 and then outwardly through orifice 78 to produce horizontal thrust. Valve member 82' is movable independently of member 82 to align openings 85 and orifices 67 when desired, thereby causing air to be directed downwardly by baffle 72, for explosion through orifice 79, with resultant vertical thrust.

Figure 12:
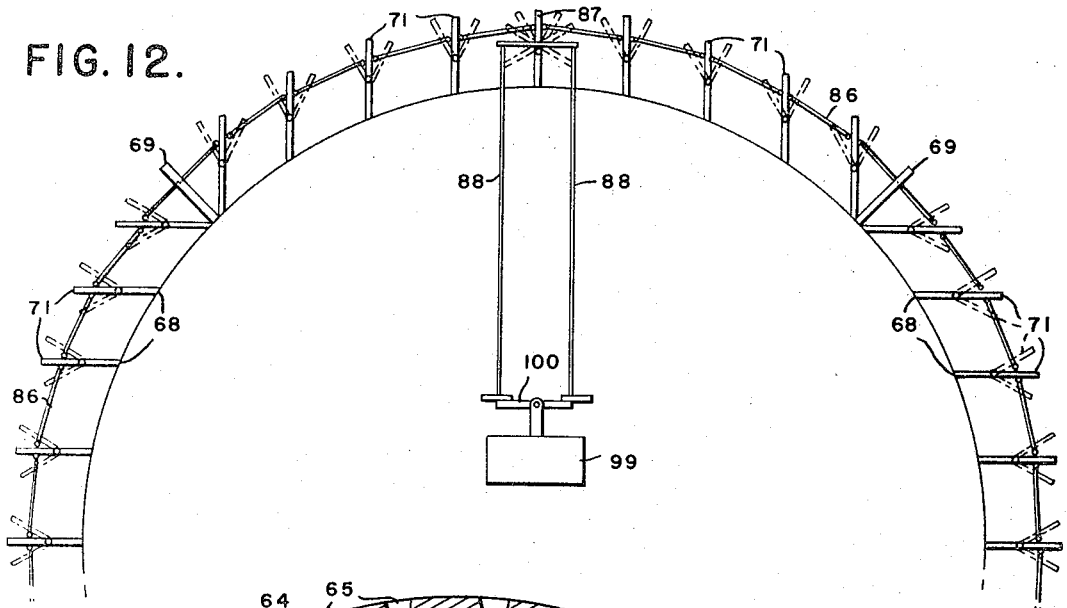
FIG. 12 is a schematic showing of the control system for the movable vanes of the airfoil lift and control device.

There is schematically illustrated in FIG. 12, means for controlling directional heading and torque of the aircraft by means of orientation of movable vanes 71 in unison. For this purpose, the movable vanes are connected by a cable 86, one end of the cable being secured to a face of a pivotally mounted cross-shaped member 87, the opposite end of the cable being engaged with the opposite face of the cross-shaped member. The transverse portion of the cross-shaped member is, in turn, provided with operating cables 88 which extend into cabin 23 for manipulation thereof in a manner to be hereinafter more fully set out.

Figure 13:
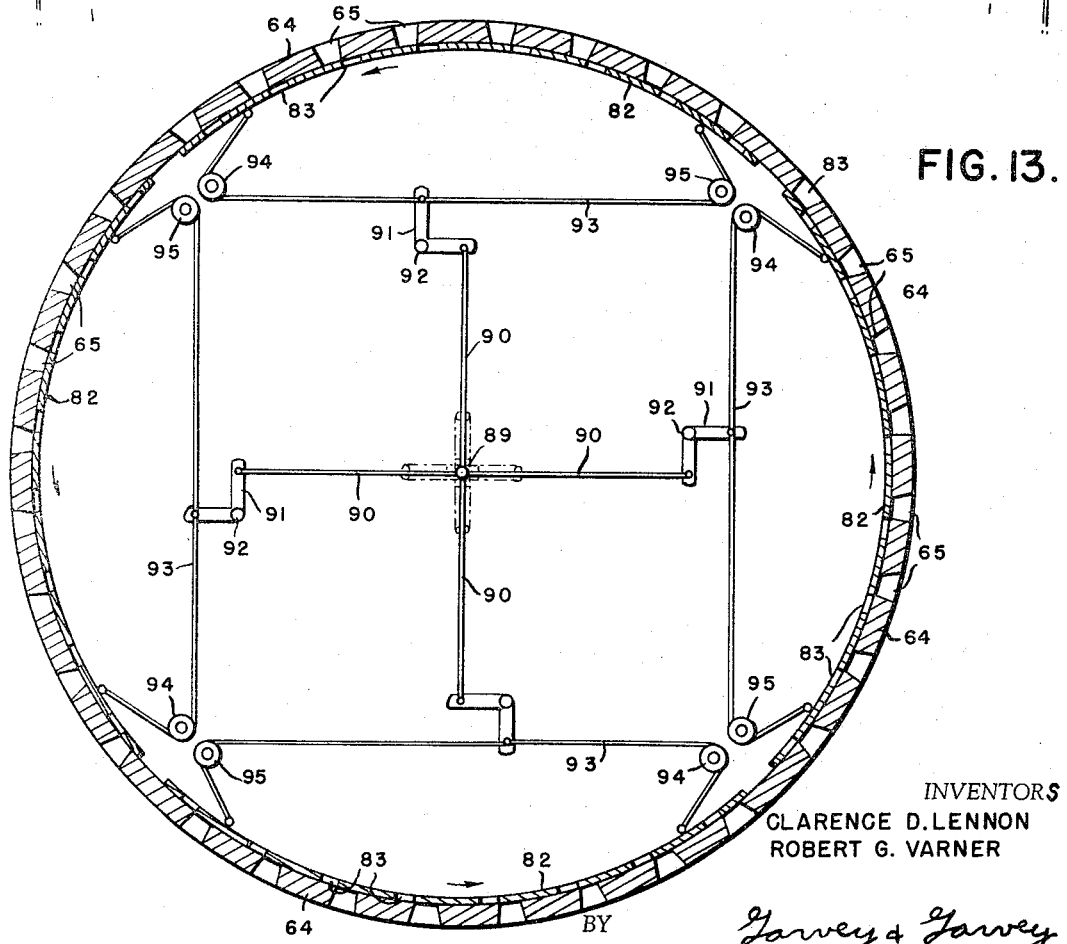
FIG. 13 is a schematic showing of the control mechanism for a sliding valve of the airfoil lift and control assembly forming a part of the present invention.

The thrust control of the aircraft includes mechanism for slidably moving valve mmebers 82 and 82'. This mechanism comprises two identical systems operable independently of one another for controlling movement of the valve members, the one system being operated by a control stick 89 and the other by a control stick 89', both located in cabin 23. This effects selective opening of horizontal thrust orifice 78 and vertical thrust orifice 79. In FIG. 13, there is illustrated the system for operating valve member 82, parts of the system shown in other figures of the drawings for operating valve member 82' being identified by like, primed numbers. The system for operating valve member 82 includes stick 89 preferably located in cabin 23, and connected to four push rods 90 located at 90° angles to each other. The lower terminal of stick 89 is journaled in any suitable bearing, permitting movement of the stick through 360°. The free terminals of push rods 90 are connected to conventional bell crank levers 91 which are pivoted at 92 in response to movement of push rods 90. Each bell crank 91 is affixed to an intermediate portion of an actuating cable 93, the terminals of which cable pass over spaced double pulleys 94 and 95 and are affixed to opposite ends of valve member segments 82. Stick 89 is also movable vertically to effect simultaneous opening of all valve members 82.

Figure 2:
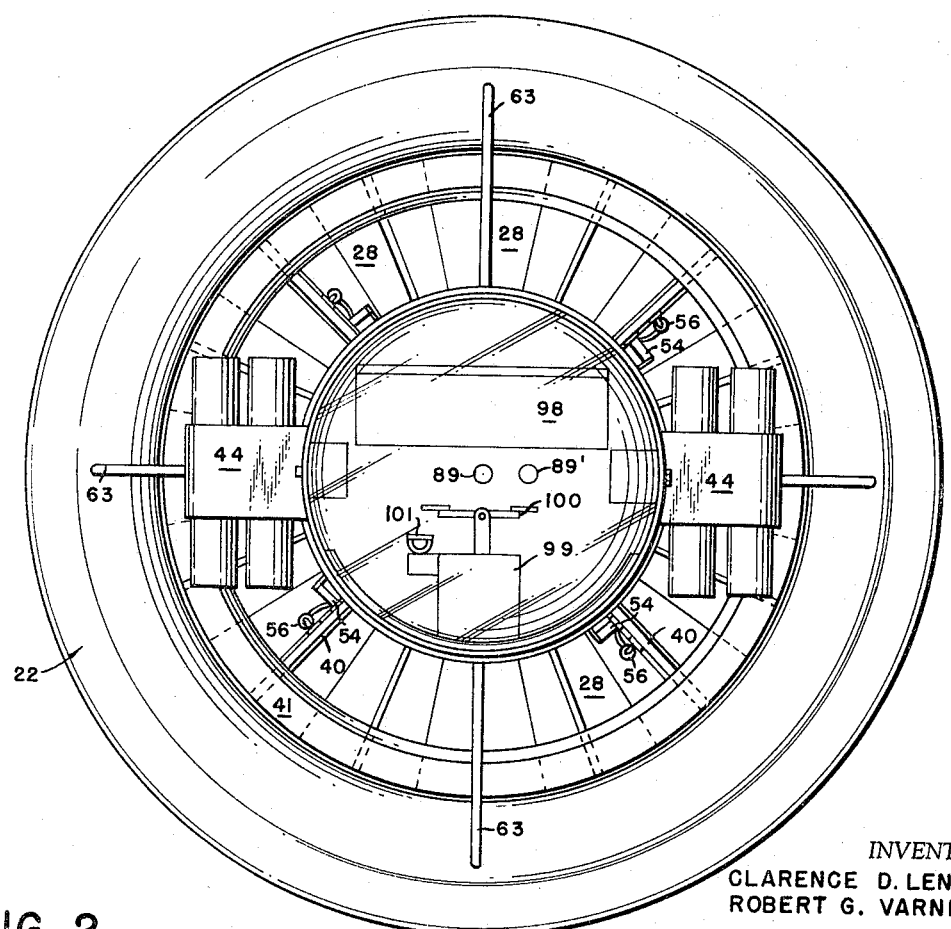
FIG. 2 is a top plan view of the same.

Cabin 23 includes a lower compartment 96 to which is hingedly connected a transparent bubble top 97. As shown in FIG. 2, compartment 96 includes a seat 98 in front of which is a control panel designated 99. A steering member or rudder bar 100 is mounted on the floor proximate seat 98, which steering member is connected to cables 88 for operating vanes 87 of the airfoil lift and control assembly 22 to effect heading and torque control of the aircraft. Control stick 89 of the thrust control is located between steering member 100 and seat 98 for controlling the opening and closing of horizontal thrust orifice 78 to effect movement of the aircraft in the desired lateral direction, i.e. forward, backward or to either side. Control stick 89' is located adjacent stick 89 for controlling the opening and closing of vertical thrust orifice 79 to effect balancing of the aircraft with respect to its vertical axis. There is also mounted on control panel 99, a manually operated handle 101 which is connected to shutter cable 36 for opening shutters 28 to effect autorotation of impeller blades 40 in the event of power failure.

In operation, engines 44 are activated to engage centrifugal clutch 48 for transmitting rotary motion from friction gear 49 to impeller drive ring 50 to initiate rotary motion of the latter about its central axis. This action forces piston 53 of each hydraulic actuator 54 inwardly, thereby effecting movement of piston 60 of cylinder 56 to its extended position, thereby inclining the movable portion 42 of blade 40 in the direction of rotation. After piston 53 has been urged into cylinder 54 to its maximum extent, blades 40 and ring 50, by virtue of connection 52, are rotated together. In normal operation, shutters 28 are in the closed position shown in FIG. 3 thereby preventing the flow of air upwardly through the base. It will be noted from FIGS. 2 and 3 however, that the upper surface of the impeller assembly is open to permit the flow of air between impeller blades 40. Upon rotation of blades 40, the air is thrown radially outwardly under centrifugal force on a line tangential to the path of rotation of the blades. The discharged air is confined between the upper surface of base 20 and the lower face of impeller ring 41.

A portion of the discharged air flows diagonally across the external surface of airfoil lift and control assembly 22, from the inboard to the outboard edge thereof. This air flow will therefore produce lift to permit vertical take-off of the aircraft. Further, as the air that is discharged from the impeller assembly strikes the inboard edge of the airfoil, a portion thereof passes through intake slot 77 into an air chamber formed by the upper and lower surfaces of the airfoil, tangentially disposed ribs 75 and circular spar 64. This air becomes partially compressed in the chamber and is then discharged selectively through orifices 65 and 66 or orifices 67. By virtue of operation of two sliding valves 82, the partially compressed air is directed into the desired discharge chamber for expulsion of the same through either horizontal thrust orifice 78 or vertical thrust orifice 79. The selective discharge of the air effects a thrust forward, backward, to either side, or in a vertical direction, to produce movement in a lateral plane and balance about its vertical axis. Operation of movable vanes 71 by steering member 100 in the stream of discharged air effects heading and torque control.

In the event that one of engines 44 fails, said engine is immediately and automatically disconnected from the impeller assembly by disengagement of centrifugal clutch 48, allowing the remaining engine to continue powering the impeller assembly. In the event of failure of the second engine, the clutch 48 is disengaged, causing relative movement of impeller drive ring 50 with respect to blades 40 under urging of hydraulic actuator 54. Piston 53 is thereby returned under hydraulic pressure to the position shown in FIG. 5 and movable portion 42 of the impeller blade inclined at an angle to the main body portion of the blade in the direction opposite to the direction of rotation. Emergency shutter handle 101 is then pulled to rotate shutter rings 31 and 34 until recesses 32 and 35 are aligned with extension tabs 30 and 33. Shutters 28 are forced open under air pressure to the position shown in dotted lines in FIG. 11 to allow air to flow upwardly through base 20 where it strikes blades 40, causing rotation thereof in the same direction in which the blades are normally rotated by engines 44. This sustains the aircraft to permit a gradual descent thereof for an emergency landing.

With the aircraft of the present invention the ascent and descent thereof are controlled by the engine throttle since an increase or decrease in the velocity of the air passing over the airfoil creates additional or less lift as desired. Therefore no moving external parts and no lateral movement of the aircraft are necessary to provide lifting, so that take-off and landing may be safely carried out from restricted areas. The present aircraft is, in effect, operating within a self-induced moving body of air, which air is directed outwardly in all directions, enabling the aircraft to obtain higher lateral velocities due to reduced overall drag. By eliminating airfoil tips, all resulting efficiency losses are eliminated and further, a relative chord greater than the actual chord is utilized, thereby creating greater relative lift for a given area than possible with conventional airfoils. In all phases of operation, the airfoil is positioned in its optimum position eliminating the need of compromise conditions such as inefficient angles of attack. Additional lift is created by virtue of the impeller assembly creating a lower air pressure on the upper surface of the base than that on the lower surface. With the control and propulsion systems of the present invention, there is no need to upset the normal gyroscopic balance produced by the revolving impeller blades to provide control in all directions. At the same time, however, the present system provides for correcting an unbalanced condition caused by loading or atmospheric disturbances. The present invention also provides the highest possible safety factors.

Although a preferred form of the present invention has been shown and described, it is nevertheless to be understood that various changes may be made therein, without departing from the spirit and scope of the claims hereto appended.

We claim:

1. An aircraft comprising a circular base, a control station mounted on said base, an impeller assembly rotatably mounted on said base, for rotation about said control station, a lift-producing air-foil circumferentially positioned around said impeller assembly, said airfoil being provided with an air intake slot inboard thereof, adjacent the outer extremity of said impeller assembly, a horizontal thrust orifice in the outer periphery of said airfoil, a vertical thrust orifice in the lower portion of said airfoil, means for selectively directing air to the horizontal thrust orifice and vertical thrust orifice, and power means for actuating said impeller assembly, to direct air substantially radially over and through said airfoil.

2. The aircraft of claim 1 with the addition of spaced stationary members within said airfoil forming air chambers, movable vanes extending from the outward edge of said stationary members, and means for relocating said movable vanes with respect to said stationary members to change the lateral direction of flight of the aircraft.

3. An aircraft comprising a circular base, a control station mounted on said base, an impeller assembly rotatably mounted on said base for rotation about said control station, said impeller assembly including a plurality of spaced blades movable in a horizontal plane, the main body portion of said blades being vertically disposed, each of said blades including a movable part hingedly connected to the main body portion of the blade, means for positioning said movable part of each blade at an angle to the main body portion thereof to change the camber of the blade relative to its vertical component, a lift-producing airfoil circumferentially positioned around said impeller assembly, and power means for actuating said impeller assembly to direct air substantially radially over and through said airfoil.

4. The aircraft of claim 3 with the addition of means in engagement with the power means comprising a drive ring rotatably mounted on said base, drive means for transmitting rotary motion from said power means to said drive ring, an actuator connected to said drive ring, said actuator being operated by movement of said driven ring, a power cylinder mounted on the main body portion of the blade, said power cylinder being in operative engagement with said actuator, a piston within said power cylinder, the free terminal of said piston being engaged with the movable part of said blade, said piston being urged by said actuator to its extended position to adjust the moving part at an angle to the main body portion of the blade.

5. An aircraft comprising a circular base embodying a central hub, spaced supports radially extending from said hub to the outer periphery of the base, shutters hingedly connected to said supports and extending between said supports when in closed position to cut off the flow of air upwardly through said base, means for opening said shutters for allowing the passage of air upwardly through said base, an impeller assembly rotatably mounted above, and operable in a plane parallel to said base, power means for normally actuating said impeller assembly, and means for changing the camber of the blades of the impeller assembly to an auto-rotative position upon failure of the power means, said impeller assembly being auto-rotated by air pressure upon opening said shutters, in the event of failure of said power means.

6. The aircraft of claim 5, wherein extension tabs are provided at the inboard and outboard edges of the shutters and a pair of rings are provided in superjacent relationship with said extension tabs.

7. An aircraft comprising a circular base, a control cabin mounted on said base, an impeller assembly rotatably mounted on said base, power means for actuating said impeller assembly, and an airfoil lift and control assembly circumferentially positioned around said impeller assembly, said airfoil lift and control assembly including an airfoil, a circular spar within said airfoil concentric with said base and impeller assembly, said spar being provided with air orifices, spaced ribs inboard of said circular spar, said ribs being disposed tangentially with respect to the circular path of movement of said impeller assembly, spaced stationary vanes within said airfoil outboard of said circular spar, forming air chambers, movable vanes extending from the outer limit of said stationary vanes, means for relocating said movable vanes with respect to said stationary vanes, an air intake slot at the inner periphery of said airfoil, a horizontal thrust orifice in the outer periphery of said airfoil, a vertical thrust orifice in the lower portion of said airfoil, and means for selectively directing air within the airfoil to the horizontal thrust orifice and vertical thrust orifice.

8. The aircraft of claim 7 wherein said means for selectively directing air to the horizontal thrust orifice and vertical thrust orifice comprises sliding valves mounted on said circular spar, said sliding valves being provided with openings selectively aligned with the air orifices of said circular spar for directing the flow of air through the vertical thrust orifice or the horizontal thrust orifice of the airfoil.

9. The aircraft of claim 8 wherein said circular base embodies a central hub, spaced supports radially extending from said hub to the outer periphery of the base, shutters hingedly connected to said supports and extending between said supports when in closed position to cut off the flow of air upwardly through the base, said shutters being provided with longitudinal extension tabs extending beyond the main body portion thereof and shutter-retaining rings mounted on said base and rotatably movable about the axis thereof, said rings being superjacent said shutters and engageable with the longitudinal extension tabs to normally retain the shutters in closed position, said rings being provided with a plurality of recesses complementing the extension tabs and normally not aligned therewith, and means for simultaneously aligning the ring recesses with said shutter extension tabs to effect opening of the shutters under air pressure in the event of power failure.

10. An aircraft comprising a circular base embodying a central hub, spaced supports radially extending from said hub to the outer periphery of the base, shutters hingedly connected to said supports and extending between said supports when in closed position to cut off the flow of air upwardly through said base, said shutters being provided with longitudinal extension tabs extending beyond the main body portion thereof, a ring mounted on said base and rotatably movable about the axis thereof, said ring being superjacent said shutters and engageable with the longitudinal extension tabs to normally retain the shutters in closed position, the ring being provided with a plurality of recesses complementing the extension tabs and normally not aligned therewith, means for simultaneously aligning the ring recesses with said shutter extension tabs to effect opening of the shutters, an impeller assembly rotatably mounted above, and operable in a plane parallel to, said base, and power means for normally actuating said impeller assembly, said impeller assembly being auto-rotated by air pressure upon opening said shutters, in the event of failure of said power means.

References Cited by the Examiner

UNITED STATES PATENTS

| | | | |
|---|---|---|---|
| 2,567,392 | 9/1951 | Naught | 244—23 |
| 2,863,621 | 12/1958 | Davis | 244—23 |
| 3,045,951 | 7/1962 | Freeland | 244—23 |
| 3,159,360 | 12/1964 | Ryan et al. | 244—17.11 X |

FOREIGN PATENTS 678,700    1/1964    Canada.

MILTON BUCHLER, *Primary Examiner.*

FERGUS S. MIDDLETON, *Examiner.*

L. C. HALL, A. E. CORRIGAN, *Assistant Examiners.*